R. A. B. WALSH.
METHOD AND APPARATUS FOR MAKING WIRE GLASS.
APPLICATION FILED DEC. 2, 1907.

940,846.

Patented Nov. 23, 1909.

Witnesses:
Geo. R. Ladson
Wells L. Church

Inventor,
Robert A. B. Walsh,
By Bakewell Cornwall Attys

UNITED STATES PATENT OFFICE.

ROBERT A. B. WALSH, OF ST. LOUIS, MISSOURI.

METHOD AND APPARATUS FOR MAKING WIRE-GLASS.

940,846.  Specification of Letters Patent.  Patented Nov. 23, 1909.

Application filed December 2, 1907. Serial No. 404,854.

*To all whom it may concern:*

Be it known that I, ROBERT A. B. WALSH, a citizen of the United States, residing at St. Louis, Missouri, have invented a certain new and useful Improvement in Methods and Apparatus for Making Wire-Glass, of which the following is a full, clear, and exact description, such as will enable others skilled in the art to which it appertains to make and use the same, reference being had to the accompanying drawings, forming part of this specification, in which—

Figure 1:
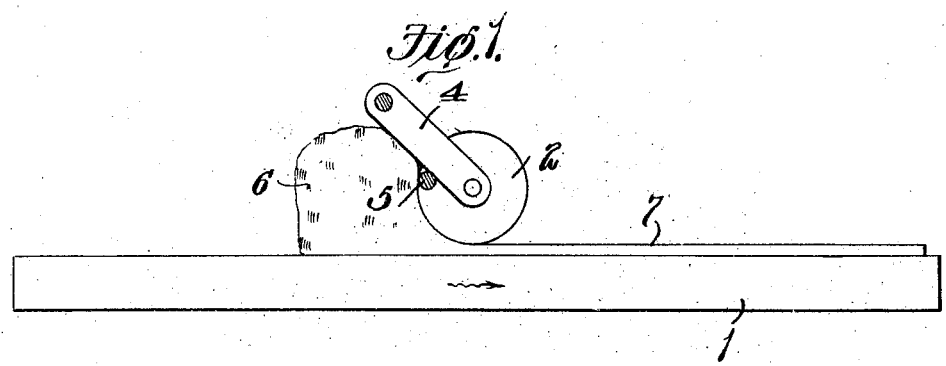
Figure 2:
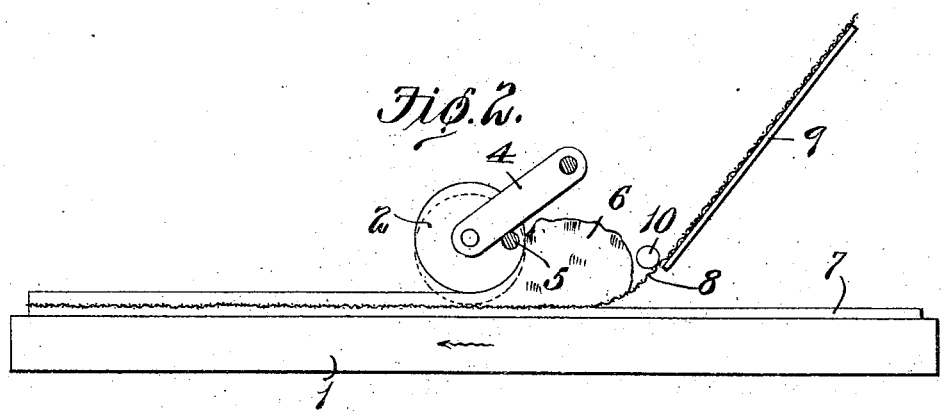
Figure 3:
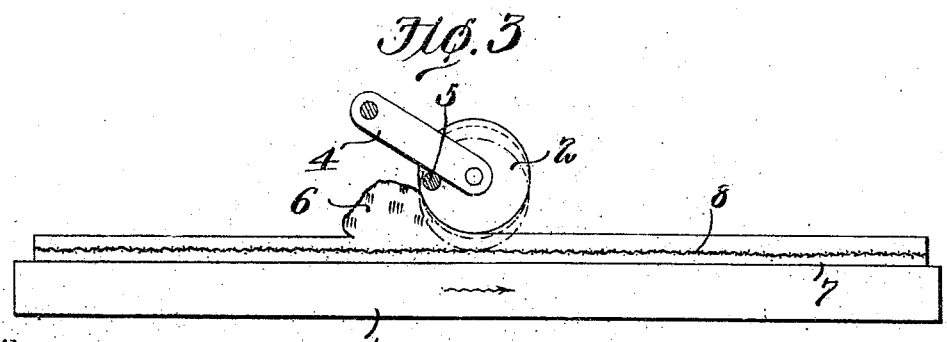

Figure 1 is a side elevation of an apparatus for practicing my method; Fig. 2 is a view similar to Fig. 1 but showing parts of the apparatus in a different position; and Fig. 3 is a similar view but showing the parts of the apparatus in still another position.

This invention relates to the manufacture of wire glass.

The object of my invention is to provide a novel method of making wire glass.

Briefly stated, my method consists in forming a sheet of wire glass from one dump or batch of molten glass which is spread or rolled into three superimposed layers, a piece of wire mesh being arranged between the bottom layer and the second layer.

I have herein illustrated one form of apparatus for practicing my method, said apparatus comprising a table 1 having an adjustable smooth-surface roller 2 arranged above same. This roller 2 is carried by pivotally mounted arms 4, and stops 5 coöperate with said arms to determine the position of the roller 2 relatively to the table 1 for a purpose hereinafter described.

To form a sheet of wire glass with an apparatus of this description I first dump a large batch 6 of molten glass onto one end of the table adjacent the roller 2 and then move said table longitudinally in the direction of the arrow in Fig. 1, thereby causing said roller to spread a portion of said batch of glass over the table to form a bottom layer 7. After said bottom layer has been completed the roller 2 is swung over onto the other side of the batch 6 of molten glass, one of the stops 5 contacting with the arms which carry the roller 2 so as to position said roller farther away from the table than when it was in its former position. A piece of wire mesh 8 is then inserted between the bottom layer 7 and the remaining portion of the mass of glass 6 and the table is moved in the opposite direction, as indicated by the arrow in Fig. 2, to cause a portion of the mass 6 to be spread over the bottom layer to cover the wire mesh 8 and thus form a second layer which is welded to the bottom layer. After the second layer has been completed the wire mesh is severed from the source of supply and the roller 2 is swung over onto the opposite side of the remaining portion of the mass of glass 6, as shown in Fig. 3, and the table is then moved in the opposite direction to that in which it traveled when the second layer was being formed so as to form a thin third layer or finishing layer for the sheet, the position of the roller, of course, being determined by the stops which coöperate with the arms 4 and which are so arranged that the roller 3 will be positioned above the table a distance equal to the thickness of the finished product. Preferably, the wire mesh is introduced into the glass by means of a chute 9 and guiding roll 10, as shown in Fig. 2, but it will, of course, be understood that the wire mesh could be introduced in other ways without departing from the spirit of my invention.

As the wire mesh is covered as soon as it has become heated from contact with the molten glass it will not oxidize but will retain its original, bright and new appearance in the finished product. The wire mesh has a tendency to contract and draw the glass in which it is embedded and this contraction of the wire mesh produces an irregular or uneven surface on the second layer. The third layer or finishing layer which is spread over the second layer, however, fills in all of the irregularities in the second layer and imparts a perfectly smooth and brilliant surface to the finished product.

Having thus described my invention, what I claim as new and desire to secure by Letters Patent is:

1. The method of making wire glass, which consists in forming a single batch or mass of molten glass into three superimposed layers and arranging a wire mesh between the bottom layer and the second layer; substantially as described.

2. The method of making wire glass, which consists in forming a single batch of molten glass into a sheet consisting of two superimposed layers, arranging a wire mesh between said layers, and spreading the remaining portion of said molten mass over the top surface of said sheet to form a finishing coating therefor; substantially as described.

3. The method of making wire glass which consists in dumping a mass of molten glass onto a casting table, rolling a portion of said mass over the table to form a bottom layer, rolling a portion of said mass in the reverse direction over the bottom layer to form a second layer, arranging a wire mesh between said layers, and spreading the remaining portion of said mass over the second layer to form a finishing layer or coating for the sheet; substantially as described.

4. The method of making wire glass, which consists in forming a portion of a mass of molten glass into two superimposed layers and arranging a wire mesh between said layers simultaneously with the operation of forming one layer, and thereafter spreading the remaining portion of said mass of molten glass over the second layer to form a finishing coating therefor; substantially as described.

5. The method of making wire glass, which consists in dumping a mass of molten glass onto a casting table and rolling a portion of said mass into a bottom layer, rolling a portion of said mass in the reverse direction over the bottom layer to form a second layer and simultaneously arranging a wire mesh between said layers, and thereafter spreading the remaining portion of said mass over the second layer to form a finishing coating therefor; substantially as described.

6. An apparatus for making wire glass, comprising means for supporting a batch of molten glass, a single member coöperating with said means and adapted to be adjusted into three different positions for forming a single batch or mass of molten glass into three superimposed layers, and means for introducing a wire mesh between two of said layers; substantially as described.

7. An apparatus for making wire glass, comprising means for supporting a batch of molten glass, and an adjustable member coöperating with said means and adapted to form a portion of a mass of molten glass into two superimposed layers and simultaneously arrange a wire mesh between said layers, said member also being adapted to be adjusted into such a position that it will spread the remaining portion of said mass of glass over the second layer to form a finishing coating therefor; substantially as described.

8. An apparatus for making wire glass, comprising a casting table, a smooth-surface roller arranged above said table, a pivotally mounted support which carries said roller, means coöperating with said support for enabling said roller to be adjusted into three different positions relatively to the table so as to form a single mass of molten glass into three superimposed layers, and means for arranging a wire mesh between the bottom layer and the second layer; substantially as described.

In testimony whereof I hereunto affix my signature in the presence of two witnesses, this twenty-sixth day of November 1907.

ROBERT A. B. WALSH.

Witnesses:
F. R. CORNWALL,
GEORGE BAKEWELL.